United States Patent
Obembe et al.

(10) Patent No.: US 10,635,561 B2
(45) Date of Patent: *Apr. 28, 2020

(54) TECHNIQUES AND ARCHITECTURES FOR MANAGING DATABASE FAILURE IN A SINGLE-NODE DATABASE ARCHITECTURE

(71) Applicant: salesforce.com, inc., San Francisco, CA (US)

(72) Inventors: Olumayokun Obembe, Concord, CA (US); Chen Liu, San Mateo, CA (US); Ping-Hsiu Hsieh, San Francisco, CA (US); Ashwini Bijwe, Hayward, CA (US); Vijayanth Devadhar, Fremont, CA (US); Mikhail Chainani, San Francisco, CA (US); Sridevi Gopala Krishnan, Foster City, CA (US); Alan Arbizu, Foster City, CA (US); Jesse Collins, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/862,525

(22) Filed: Jan. 4, 2018

(65) Prior Publication Data

US 2018/0329793 A1  Nov. 15, 2018

Related U.S. Application Data

(60) Provisional application No. 62/505,049, filed on May 11, 2017.

(51) Int. Cl.
*G06F 11/00* (2006.01)
*G06F 11/30* (2006.01)
(Continued)

(52) U.S. Cl.
CPC .......... *G06F 11/3089* (2013.01); *G06F 11/14* (2013.01); *G06F 11/2038* (2013.01);
(Continued)

(58) Field of Classification Search
CPC ............ G06F 11/0754; G06F 11/0757; G06F 11/076; G06F 11/141; G06F 11/2023
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

Notice of Allowance for U.S. Appl. No. 15/804,254 dated Jun. 5, 2019, 8 pages.

*Primary Examiner* — Elmira Mehrmanesh
(74) *Attorney, Agent, or Firm* — Jaffery, Watson, Mendonsa & Hamilton, LLP

(57) ABSTRACT

In a computing environment having multiple application servers each having at least one connection agent and at least one pause agent and a database node, detecting an error condition between a first application server from the multiple application servers and the database node. Indicating that the database node is unavailable to stop attempts to access the database node by a first application server. The attempts to access the database node are paused without an indication of the database node being unavailable to a source of the attempt to access the database node. Checking periodically, with the first application server, availability of the database node. Indicating that the database node is available in response to a pre-selected number of successful attempts to contact the database node with the first application server.

12 Claims, 12 Drawing Sheets

(51) Int. Cl.
*G06F 11/14* (2006.01)
*G06F 16/21* (2019.01)
*G06F 16/23* (2019.01)
*G06F 11/20* (2006.01)
*G06F 11/36* (2006.01)

(52) U.S. Cl.
CPC ...... *G06F 11/2048* (2013.01); *G06F 11/2094* (2013.01); *G06F 11/2097* (2013.01); *G06F 11/3664* (2013.01); *G06F 16/21* (2019.01); *G06F 16/2365* (2019.01); *G06F 2201/84* (2013.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,243,093 B2 | 7/2007 | Cragun et al. | |
| 7,289,976 B2 | 10/2007 | Kihneman et al. | |
| 7,340,411 B2 | 3/2008 | Cook | |
| 7,539,746 B2 * | 5/2009 | Bankier | G06Q 20/00 709/203 |
| 7,620,655 B2 | 11/2009 | Larsson et al. | |
| 9,582,367 B2 | 2/2017 | An et al. | |
| 9,723,009 B2 | 8/2017 | Makhervaks et al. | |
| 10,025,839 B2 | 7/2018 | Dahan et al. | |
| 10,033,603 B2 * | 7/2018 | Gurdasani | H04L 43/06 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0154236 A1 | 8/2003 | Dar et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0162836 A1 * | 8/2004 | Aronoff | H04L 29/06 |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0219972 A1 | 9/2007 | Cragun et al. | |
| 2009/0177744 A1 | 7/2009 | Marlow et al. | |
| 2009/0201799 A1 * | 8/2009 | Lundstrom | H04L 41/06 370/217 |
| 2013/0325828 A1 * | 12/2013 | Larson | G06F 16/2365 707/703 |
| 2014/0074717 A1 * | 3/2014 | Evans | G06Q 20/10 705/44 |
| 2014/0075017 A1 * | 3/2014 | Wang | G06F 9/50 709/224 |
| 2015/0301910 A1 * | 10/2015 | Sathyanarayana | G06F 11/1658 714/4.11 |

(56) References Cited

U.S. PATENT DOCUMENTS

| | | | |
|---|---|---|---|
| 2015/0317221 A1* | 11/2015 | Sampath | G06F 11/0793 |
| | | | 714/4.11 |
| 2016/0072817 A1 | 3/2016 | Makhervaks et al. | |
| 2016/0085646 A1* | 3/2016 | Joshi | G06F 11/2041 |
| | | | 714/4.11 |
| 2017/0017562 A1* | 1/2017 | Gulkis | G06F 11/3612 |
| 2017/0213046 A1* | 7/2017 | Kaduluri | G06F 16/27 |
| 2017/0302673 A1 | 10/2017 | Makhervaks et al. | |
| 2018/0239677 A1* | 8/2018 | Chen | G06F 11/203 |
| 2018/0331887 A1* | 11/2018 | Obembe | H04L 41/0654 |

* cited by examiner

TECHNIQUES AND ARCHITECTURES FOR MANAGING DATABASE FAILURE IN A SINGLE-NODE DATABASE ARCHITECTURE

CLAIM OF PRIORITY

This application claims the benefit of U.S. Provisional Patent Application No. 62/505,049 entitled "PAUSER", filed May 11, 2017, the entire contents of which are incorporated herein by reference.

TECHNICAL FIELD

Embodiments relate to techniques for managing server availability in a multi-server environment utilizing a single database node. More particularly, embodiments relate to techniques for more accurately monitoring and flagging service disruptions within a multi-server environment utilizing a single database node.

BACKGROUND

A "split-brain" condition can exist in response to data or availability inconsistencies from inconsistent, overlapping data sets. For example, in a multiple server environment when not all application servers have the same view of shared database nodes, a split-brain condition can exist from different application servers having different determinations of the availability of individual database nodes. This can result in inefficiencies when human intervention is required to reset database nodes or take other corrective action.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Figure 1:
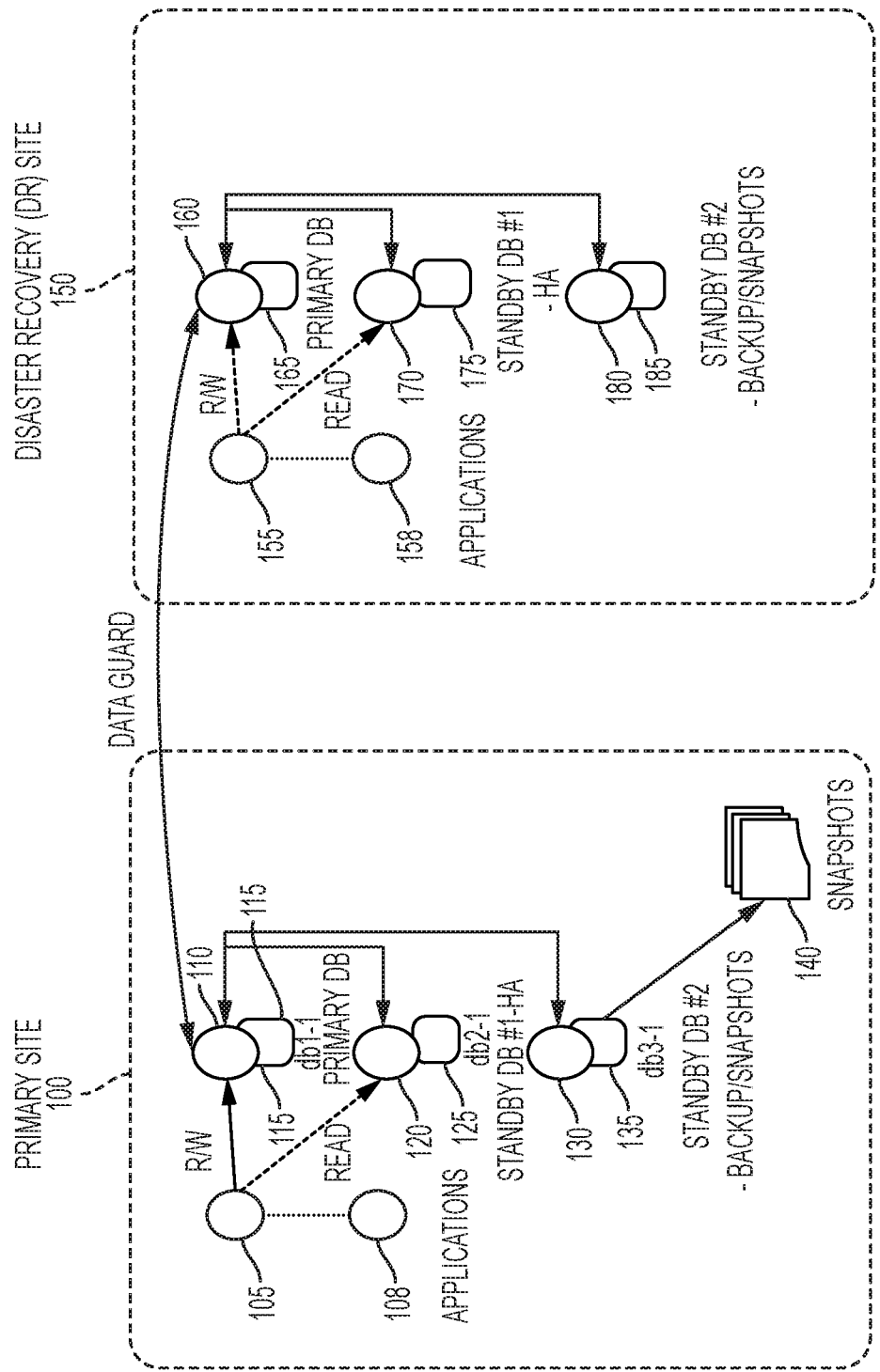
FIG. 1 is a block diagram of one embodiment of a single-node database environment.

FIG. 1 is a block diagram of one embodiment of a single-node database environment. In the example of FIG. 1, primary site 100 provides a single-node database environment for one or more applications (e.g., 105, 108). Any number of applications can be supported by primary site 100. During normal operation, primary database 110 provides read and write (R/W) functionality to the applications. Snapshots 115 can be maintained for backup and/or rollback functionality for primary database 110.

In one embodiment, standby database 120 provides read (R) functionality to the applications. Snapshots 125 can be maintained for backup and/or rollback functionality. In one embodiment, changes to primary database 110 are carried over to standby database 120. The changes to standby database 120 based on activity in primary database 110 and can be made periodically (e.g., every minute, every five minutes). In one embodiment, standby database 120 is updated relatively frequently so that minimal data is lost when data is read from standby database 120.

In one embodiment, backup database 130 provides backup/snapshot storage functionality to the applications. Snapshots 135 can be maintained for backup and/or rollback functionality. In one embodiment, changes to primary database 110 are carried over to backup database 130. The changes to backup database 130 based on activity in primary database 110 and can be made periodically (e.g., every hour, every 90 minutes). In one embodiment, backup database 130 is updated relatively infrequently so that minimal overhead is incurred to maintain backup database 130. In one embodiment, snapshots 140 can be maintained as part of an overall backup strategy.

In one embodiment disaster recovery (DR) site 150 is configured similarly to primary site 100. In one embodiment, primary database 160 can be synchronized with primary database 110 to be ready to provide read/write (R/W) functionality for one or more applications (e.g., 105, 108, 155, 158) if primary site 100 is unavailable for any reason. Snapshots 165 can be maintained for backup and/or rollback functionality for primary database 160.

In one embodiment, standby database 170 provides read (R) functionality to the applications. Snapshots 175 can be maintained for backup and/or rollback functionality. In one embodiment, changes to primary database 160 are carried over to standby database 170. The changes to standby database 170 based on activity in primary database 160 and can be made periodically (e.g., every minute, every five minutes). In one embodiment, standby database 170 is updated relatively frequently so that minimal data is lost when data is read from standby database 170.

In one embodiment, backup database 180 provides backup/snapshot storage functionality to the applications. Snapshots 185 can be maintained for backup and/or rollback functionality. In one embodiment, changes to primary database 160 are carried over to backup database 180. The changes to backup database 180 based on activity in primary database 160 and can be made periodically (e.g., every hour, every 90 minutes). In one embodiment, backup database 180 is updated relatively infrequently so that minimal overhead is incurred to maintain backup database 180.

Figure 2:
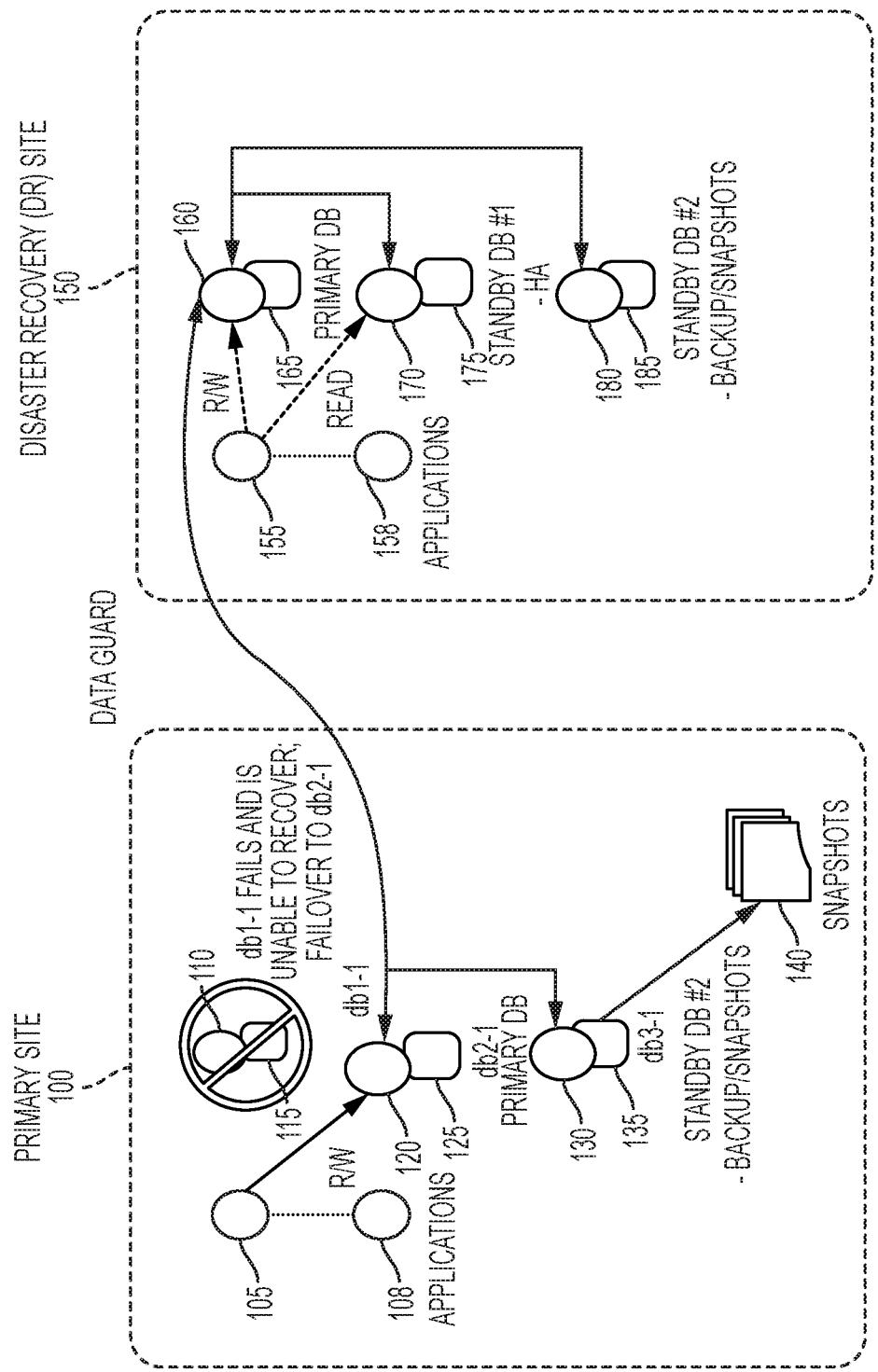
FIG. 2 is a block diagram of one embodiment of a single-node database environment after failover from a primary database to a local standby database.

FIG. 2 is a block diagram of one embodiment of a single-node database environment after failover from a primary database to a local standby database. In the example of FIG. 2, primary database 110 has failed and is unable to recover. This causes a failover to standby database 120, which becomes the primary database and backup database 130 becomes the standby database. DR site 150 operates in a similar manner as before except that primary database 160 is synchronized with (now primary) database 120.

Figure 3:
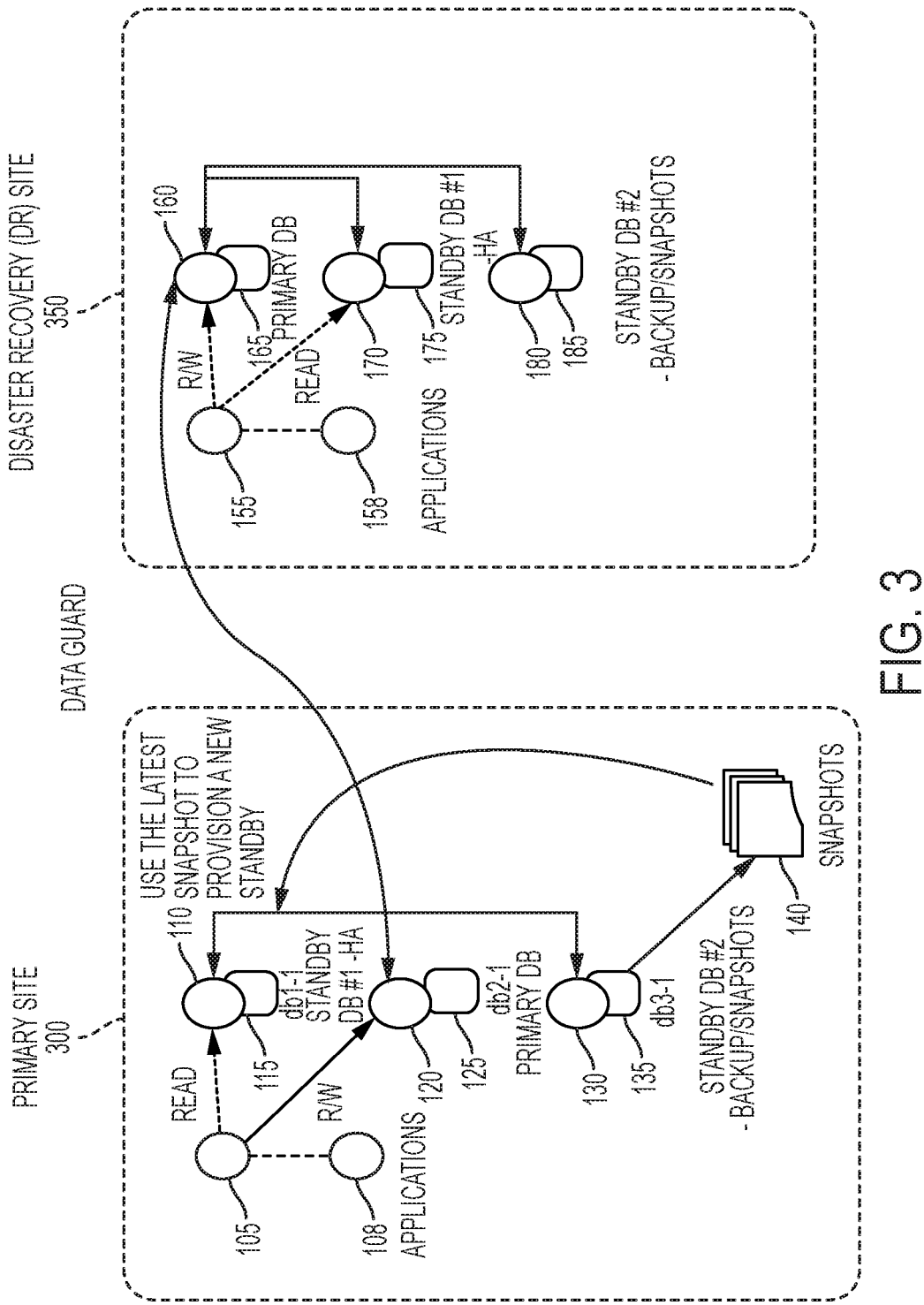
FIG. 3 is a block diagram of one embodiment of a single-node database environment after provisioning of a new standby database.

FIG. 3 is a block diagram of one embodiment of a single-node database environment after provisioning of a new standby database. In the example of FIG. 3, primary database 110 has been restored using snapshots 140 and has been configured to be a standby database to provide read access to the applications.

In the discussion that follows, the database architectures of FIGS. 1-3 can be utilized with a pause mode functionality that can be a more stable and more efficient environment than systems using traditional techniques.

Figure 4:
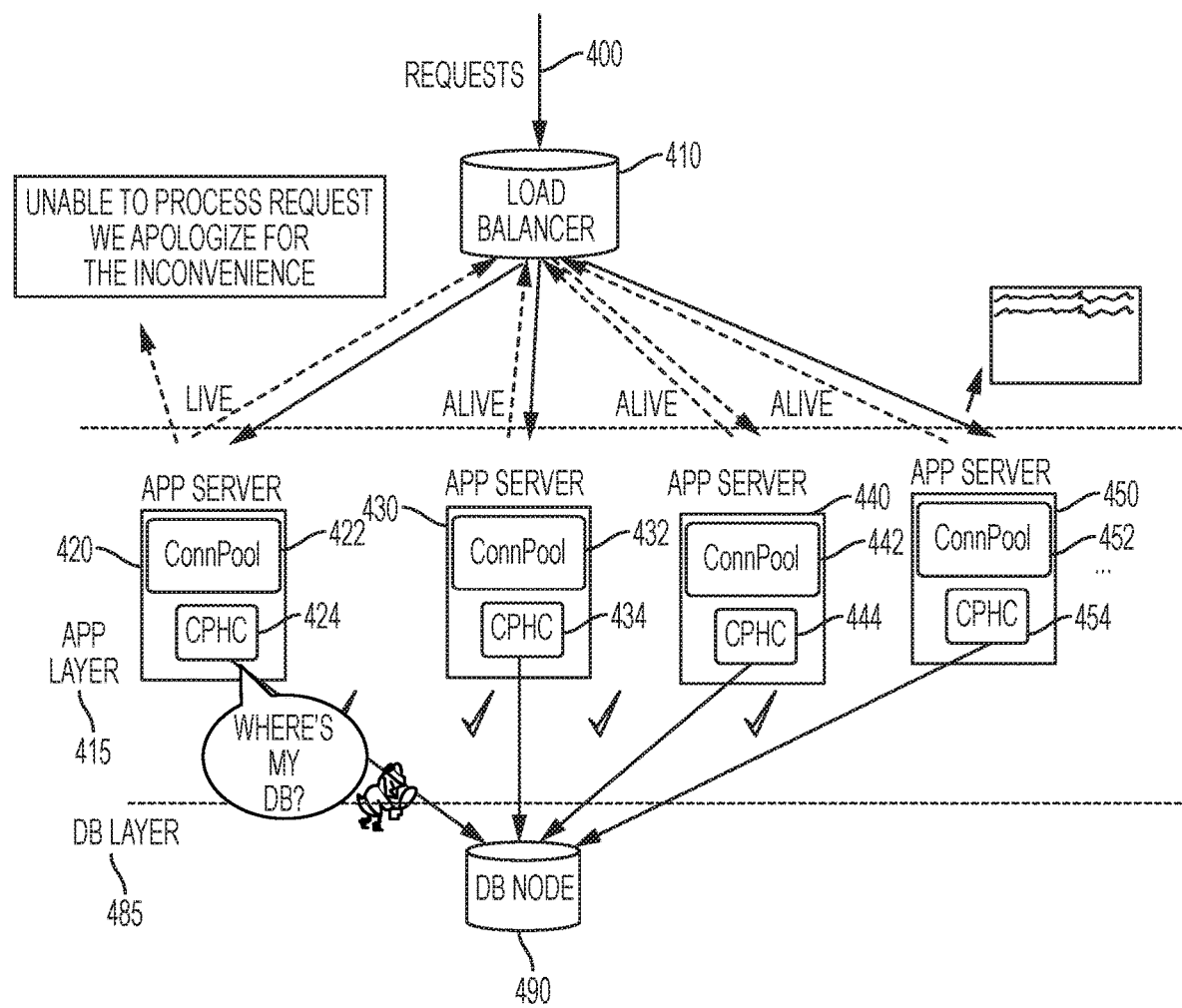
FIG. 4 is a block diagram of one embodiment of a single-node database environment with multiple application servers utilizing traditional request service techniques.

FIG. 4 is a block diagram of one embodiment of a single-node database environment with multiple application servers utilizing traditional request service techniques. The example of FIG. 4 illustrates operation without the pause mode functionality described herein. Requests 400 are received through load balancer 410 that operates to distribute the requests to one or more app servers (e.g., 420, 430 440, 450). The architecture of FIG. 4 can conceptually be organized as app layer 415 that includes the app servers and database layer 485 that includes the database node.

In the example of FIG. 4, each application server includes at least a connection pool agent (e.g., 422, 432, 442, 452) to manage connections between the host app server and database node 490. Each application server further includes connection checking agent (e.g., 424, 434, 444, 454) that functions to monitor the availability of connections between the host app server and database node 490.

During operation, if a connection is unavailable, the corresponding connection checking agent can mark the connection as down, which can result in a service outage. The condition of the connection being unavailable can be temporary or permanent (e.g., requiring restart) and/or the problem can be in the connection or with database node 490.

Under certain conditions, for example, a slow connection caused by high traffic, the connection could be flagged as down when the undesirable conditions would resolve themselves. When the conditions can resolve themselves, restarting an app server and/or database, or additional actions would be inefficient and cause unnecessary disruption. However, using the techniques and architectures described herein can avoid the unnecessary disruptions.

Figure 5:
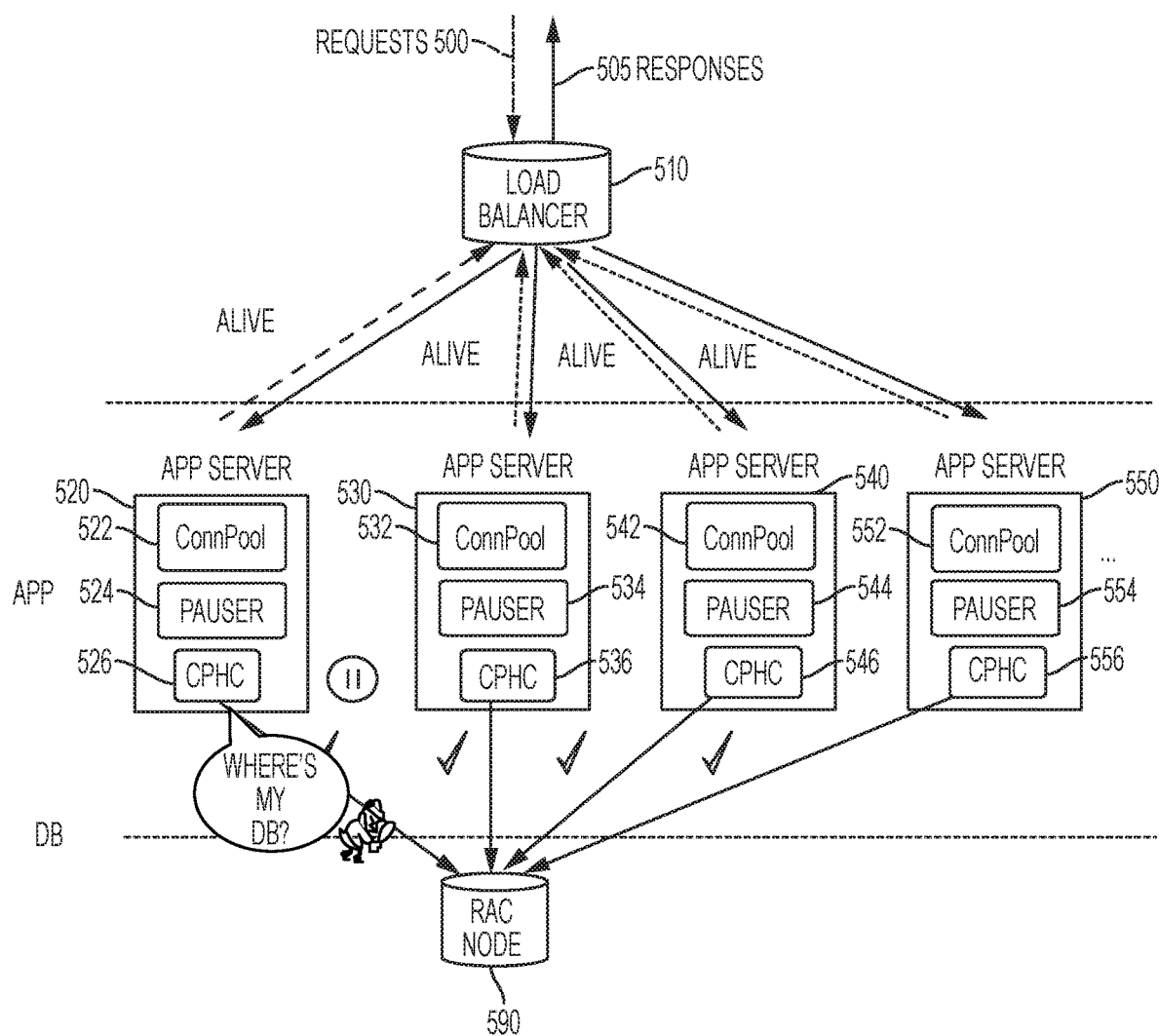
FIG. 5 is a block diagram of one embodiment of a single-node database environment with multiple application servers utilizing pause mode techniques.

FIG. 5 is a block diagram of one embodiment of a single-node database environment with multiple application servers utilizing pause mode techniques. The architecture of FIG. 5 is an example embodiment that can avoid the unnecessary disruptions discussed above. In the example of FIG. 5 only one application server is not connecting to the database node. As described in greater detail, the situation in which multiple application servers cannot connect to the database node can also be handled.

Requests 500 are received through load balancer 510 that operates to distribute the requests to one or more app servers (e.g., 520, 530 540, 550). The app servers service the requests by accessing database node 590 and generating responses 505.

In the example of FIG. 5, each application server includes at least a connection pool agent (e.g., 522, 532, 542, 552) to manage connections between the host app server and database node 590. Each application server also includes at least a pause agent (e.g., 524, 534, 544, 554). Each application server further includes connection checking agent (e.g., 526, 536, 546, 556) that functions to monitor the availability of connections between the host app server and database node 590.

During operation, if a connection is unavailable, the corresponding connection checking agent can mark the connection as down. In one embodiment, in response to database node 590 not being available to app server 520, pause agent 524 can cause connection checking agent 526 to delay (or pause the process of) indicating that database node 590 is not available to app server 520.

In one embodiment, pause agent 524 pauses the process for a period of time (e.g., 1 minute, 2 minutes, 90 seconds, 45 seconds) before rechecking the connection and determining whether database node 590 is available. In another embodiment, pause agent 524 pauses the process for a pre-selected number of attempts (e.g., 150, 90, 250, 125) by connection checking agent 526 before rechecking the connection and determining whether database node 590 is available. Other and/or different parameters can also be utilized.

In one embodiment, at the end of the pause/delay period, the connection checking agent can determine whether the database node is available to the host app server. Thus, for conditions that resolve themselves, the system may appear slower to a user, but recovery processes (e.g., restart) can be avoided. In one embodiment, at the end of the pause/delay period, if the database node is still not available, a recovery process (e.g., restart) can be initiated.

Figure 6:
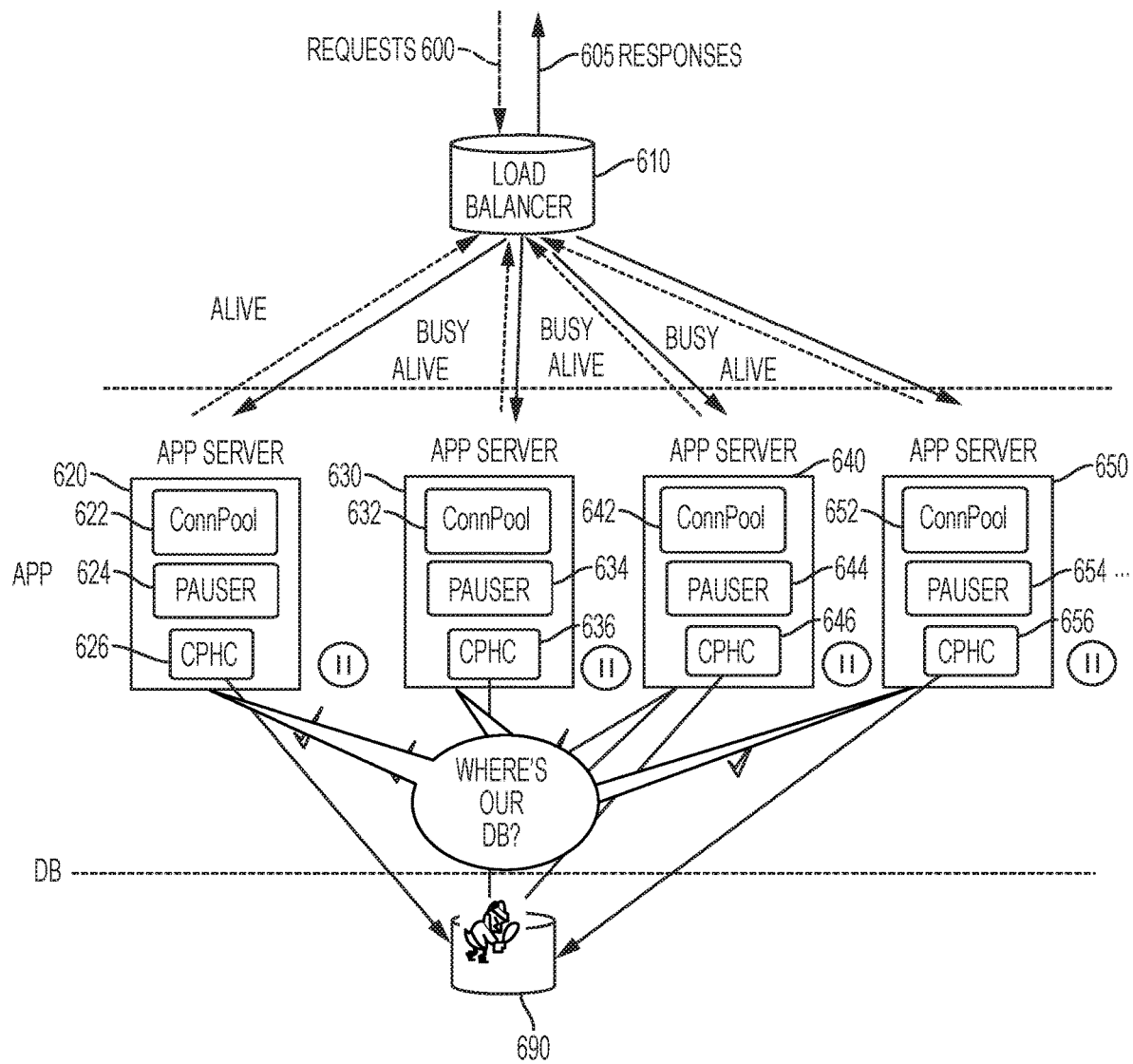
FIG. 6 is a block diagram of one embodiment of a single-node database environment with multiple application servers experiencing a hard failure utilizing pause mode techniques.

FIG. 6 is a block diagram of one embodiment of a single-node database environment with multiple application servers experiencing a hard failure utilizing pause mode techniques. The architecture of FIG. 6 is another example embodiment that can avoid the unnecessary disruptions discussed above. In the example of FIG. 6 multiple applications server are not connecting to the database node.

Requests 600 are received through load balancer 610 that operates to distribute the requests to one or more app servers (e.g., 620, 630 640, 650). The app servers service the requests by accessing database node 690 and generating responses 605.

In the example of FIG. 6, each application server includes at least a connection pool agent (e.g., 622, 632, 642, 652) to manage connections between the host app server and database node 690. Each application server also includes at least a pause agent (e.g., 624, 634, 644, 654). Each application server further includes connection checking agent (e.g., 626, 636, 646, 656) that functions to monitor the availability of connections between the host app server and database node 690.

During operation, if multiple connections are unavailable, the corresponding connection checking agents can mark the connections as down. In one embodiment, in response to database node 690 not being available to multiple app servers, the corresponding pause agents can cause connection checking agents of the app servers to delay (or pause the process of) indicating that database node 690 is not available to app server 620.

In one embodiment, pause agent 624 pauses the process for a period of time (e.g., 1 minute, 2 minutes, 90 seconds, 45 seconds) before rechecking the connection and determining whether database node 690 is available. In another embodiment, pause agent 624 pauses the process for a pre-selected number of attempts (e.g., 150, 90, 250, 125) by connection checking agent 626 before rechecking the connection and determining whether database node 690 is available. Other and/or different parameters can also be utilized.

In one embodiment, at the end of the pause/delay period, the connection checking agents can determine whether the database node is available to the host app server. In one embodiment, each pause agent operates independently of other pause agents. That is, the timing of the pause (and/or the delay) of the individual pause agents is not linked to any of the other pause agents.

Figure 7:
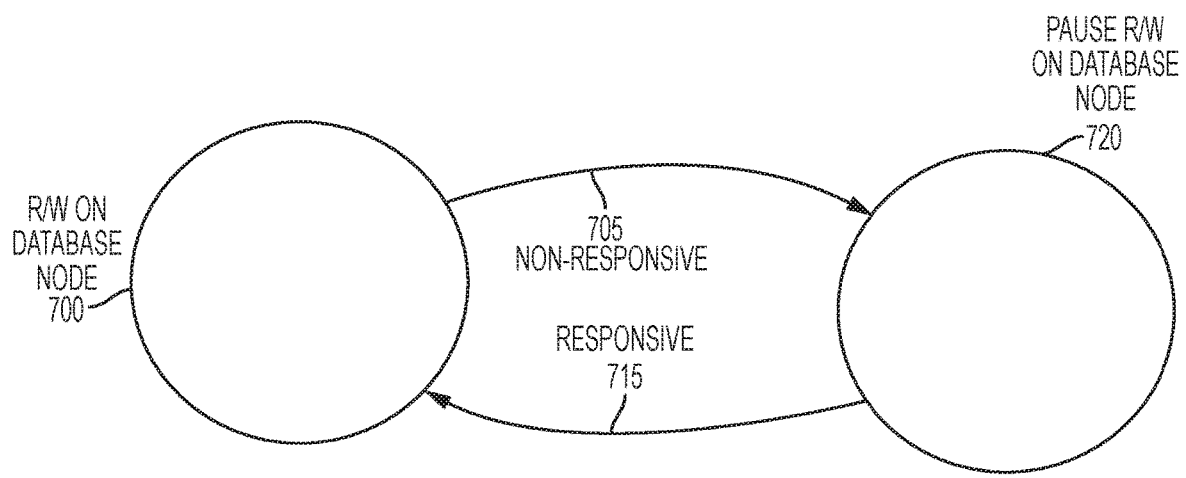
FIG. 7 is a state diagram for one embodiment of a basic pause mode utilization.

FIG. 7 is a state diagram for one embodiment of a basic pause mode utilization. In one embodiment, during normal operation in state 700 read and write (R/W) access is provided to a database node (e.g., node 590). When the database node is non-responsive, 705, the system transitions to state 720 in which R/W access is paused. As discussed above, the pause can be based on time (e.g., 10 seconds, 2 minutes) and/or based on connection attempts (e.g., mark non-responsive after 2 failed attempts, mark non-responsive if too slow, mark responsive after 10 consecutive successful connection attempts, mark responsive after 50 consecutive successful connection attempts). When the connection is responsive again, 715, the system can transition back to state 700 and continue normal operation.

Figure 8:
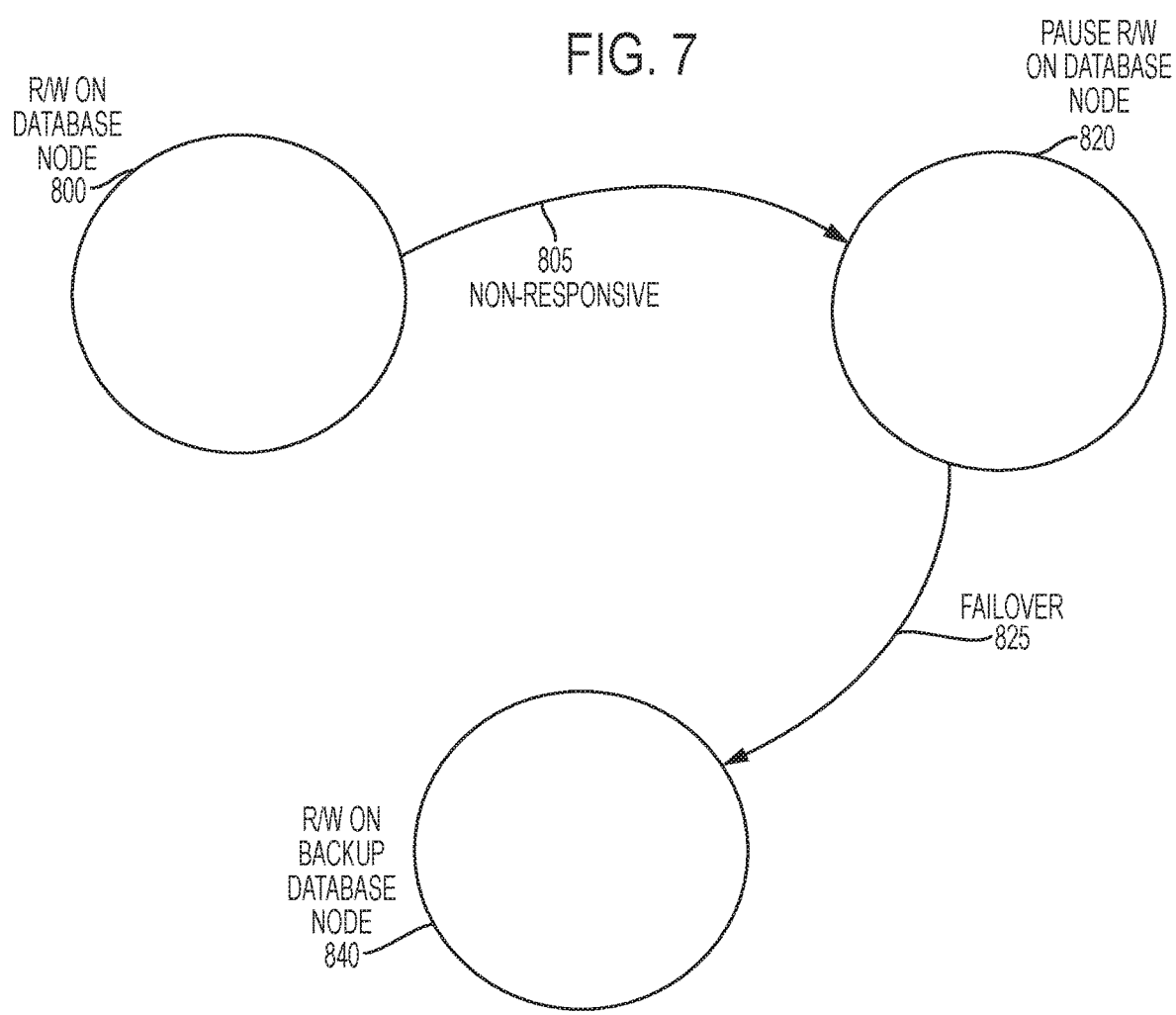
FIG. 8 is a state diagram for one embodiment of an intermediate pause mode utilization.

FIG. 8 is a state diagram for one embodiment of an intermediate pause mode utilization. In one embodiment, during normal operation in state 800 read and write (R/W) access is provided to a database node (e.g., node 590). When the database node is non-responsive, 805, the system transitions to state 820 in which R/W access is paused.

As discussed above, the pause can be based on time and/or based on connection attempts. In one embodiment, state 820 can be utilized as a transition state as part of a failover procedure, 825, to running a backup database in state 840. Because database failover takes some time to complete, use of state 820 can provide an intermediate state to appear to a user that the system is slow rather than down.

Figure 9:
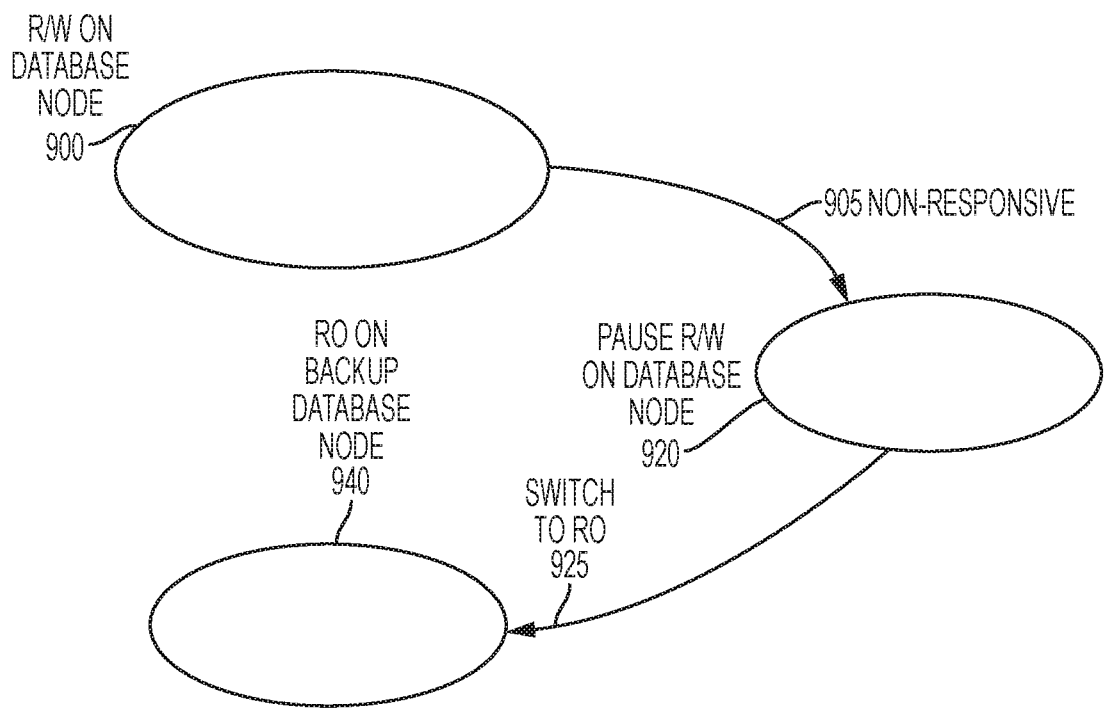
FIG. 9 is a state diagram for one embodiment of an intermediate pause mode utilizing a read-only option.

FIG. 9 is a state diagram for one embodiment of an intermediate pause mode utilizing a read-only option. In one embodiment, during normal operation in state 900 read and write (R/W) access is provided to a database node (e.g., node 590). When the database node is non-responsive, 905, the system transitions to state 920 in which R/W access is paused.

As discussed above, the pause can be based on time and/or based on connection attempts. In one embodiment, state 920 can be utilized as a transition state as part of a switch over procedure, 925, to providing read-only (RO) access to a backup database node in state 940. This can give a user access to stored data when the primary database is unavailable. Data to be written can be logged for later processing, for example, when the primary database has been restored.

Figure 10:
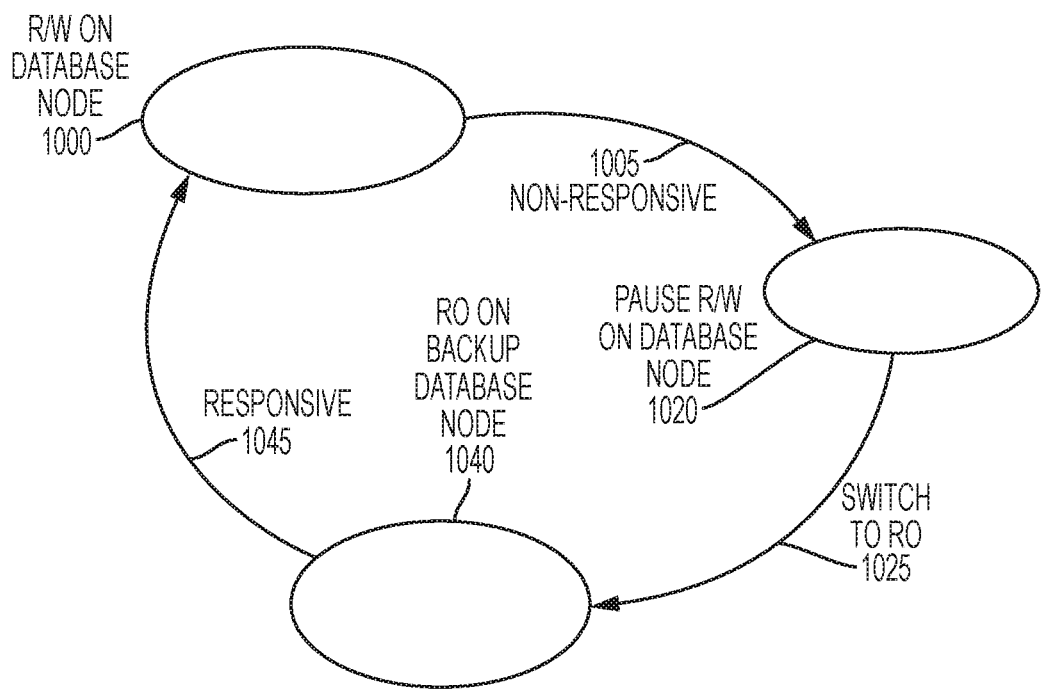
FIG. 10 is a state diagram for one embodiment of an intermediate pause mode utilizing a read-only option to return to the primary database node.

FIG. 10 is a state diagram for one embodiment of an intermediate pause mode utilizing a read-only option to return to the primary database node. In one embodiment, during normal operation in state 1000 read and write (R/W) access is provided to a database node (e.g., node 590). When the database node is non-responsive, 1005, the system transitions to state 1020 in which R/W access is paused.

As discussed above, the pause can be based on time and/or based on connection attempts. In one embodiment, state 1020 can be utilized as a transition state as part of a switch over procedure, 1025, to providing read-only (RO) access to a backup database node in state 1040. This can give a user access to stored data when the primary database is unavailable.

In one embodiment, during state 1040, the system continues to check to determine if the primary database node is responsive. When the connection is responsive again, 1045, the system can transition back to state 1000 and continue normal operation using the primary database node.

Figure 11:
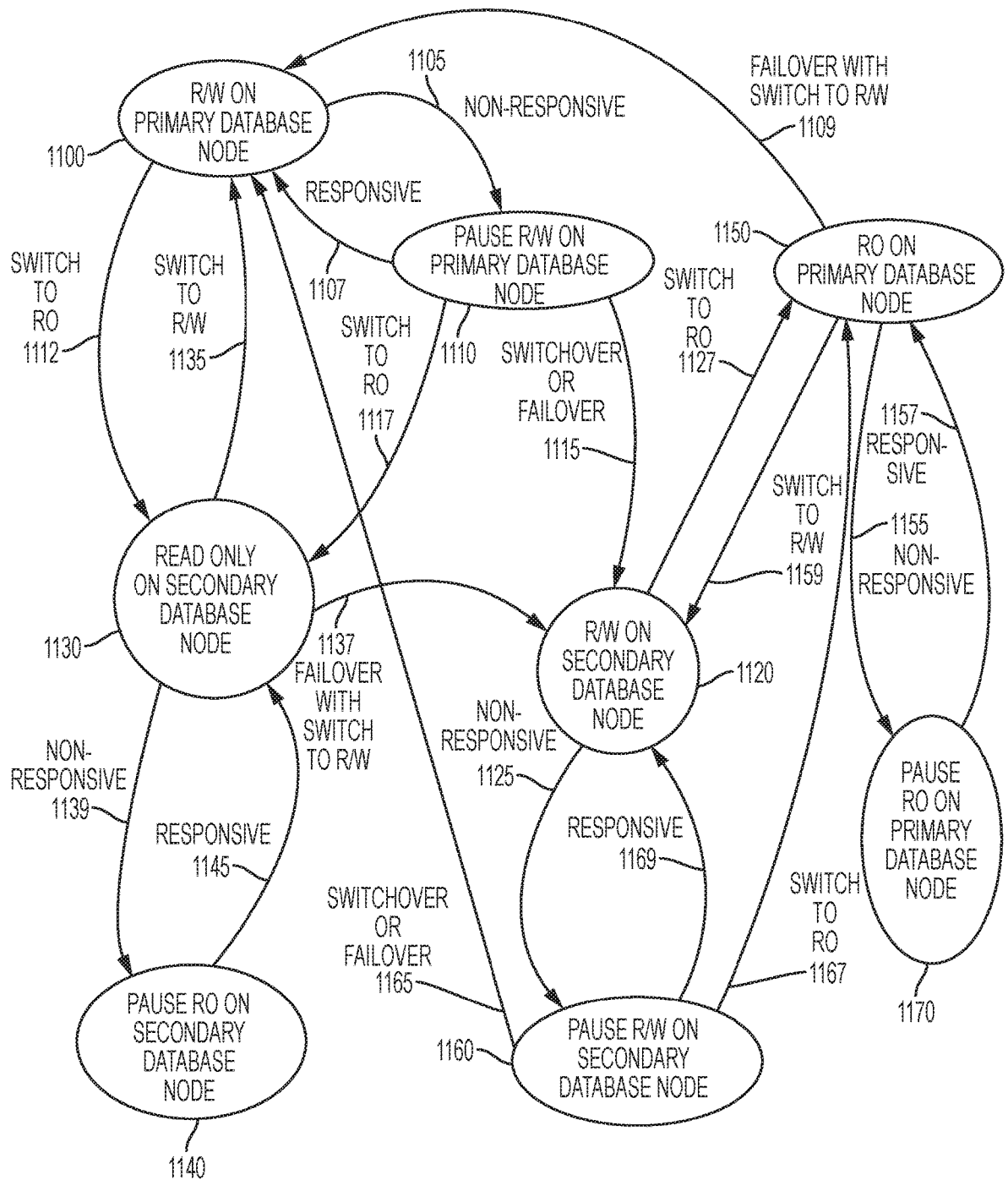
FIG. 11 is a state diagram for one embodiment of a comprehensive pause mode utilization.

FIG. 11 is a state diagram for one embodiment of a comprehensive pause mode utilization. The state diagram of FIG. 11 provides the functionality of the state diagrams discussed above as well as additional functionality.

In one embodiment, during normal operation in state 1100 read and write (R/W) access is provided to a primary database node (e.g., node 590). When the primary database node is non-responsive, 1105, the system transitions to state 1110 in which R/W access is paused. If the primary database node becomes responsive, 1107, when the system is in state 1110, the system can transition back to state 1100 and provide R/W access to the primary database node.

Under certain conditions, when in state 1100, the system can transition (1112) to state 1130 in which read-only (RO) access is granted to the secondary database node. When in state 1130, if the primary database node becomes fully available again, the system can transition (1135) from state 1130 back to state 1100 to provide R/W access to the primary database node.

In one embodiment, if the system is in state 1130 and the secondary database node becomes non-responsive, 1139, the system can transition to state 1140, which pauses RO access on the secondary database node. In one embodiment, if the system is in state 1140 and the secondary database node becomes responsive, 1145, the system can transition back to state 1130, which to provide RO access on the secondary database node.

Returning to state 1110, the system can switch to RO (1117) access on the secondary database node in state 1130. Alternatively, in response to a switch over or failover (1115), the system can transition to state 1120 where R/W access to the secondary database is provided. Similarly, when in state 1130 and in response to a failover to the secondary database node (1137), the system can also transition to state 1120 where R/W access to the secondary database is provided.

In one embodiment, if the system is in state 1120 and the secondary database node becomes non-responsive, 1125, the system can transition to state 1160, which pauses R/W access on the secondary database node. In one embodiment, if the system is in state 1160 and the secondary database node becomes responsive, 1169, the system can transition back to state 1120, which to provide R/W access on the secondary database node.

Under certain conditions, when in state 1120, the system can transition (1127) to state 1150 in which RO access is granted to the primary database node. When in state 1150, if the primary database node becomes un available again, the system can transition (1159) from state 1150 back to state 1120 to provide R/W access to the secondary database node.

In one embodiment, if the system is in state 1150 and the primary database node becomes non-responsive, 1155, the system can transition to state 1170, which pauses RO access on the primary database node. In one embodiment, if the system is in state 1170 and the primary database node becomes responsive, 1157, the system can transition back to state 1150, which to provide RO access on the primary database node.

In one embodiment, when the primary database becomes fully available again, the system can perform a failover, 1109, to switch to providing R/W access to the primary database node.

Figure 12:
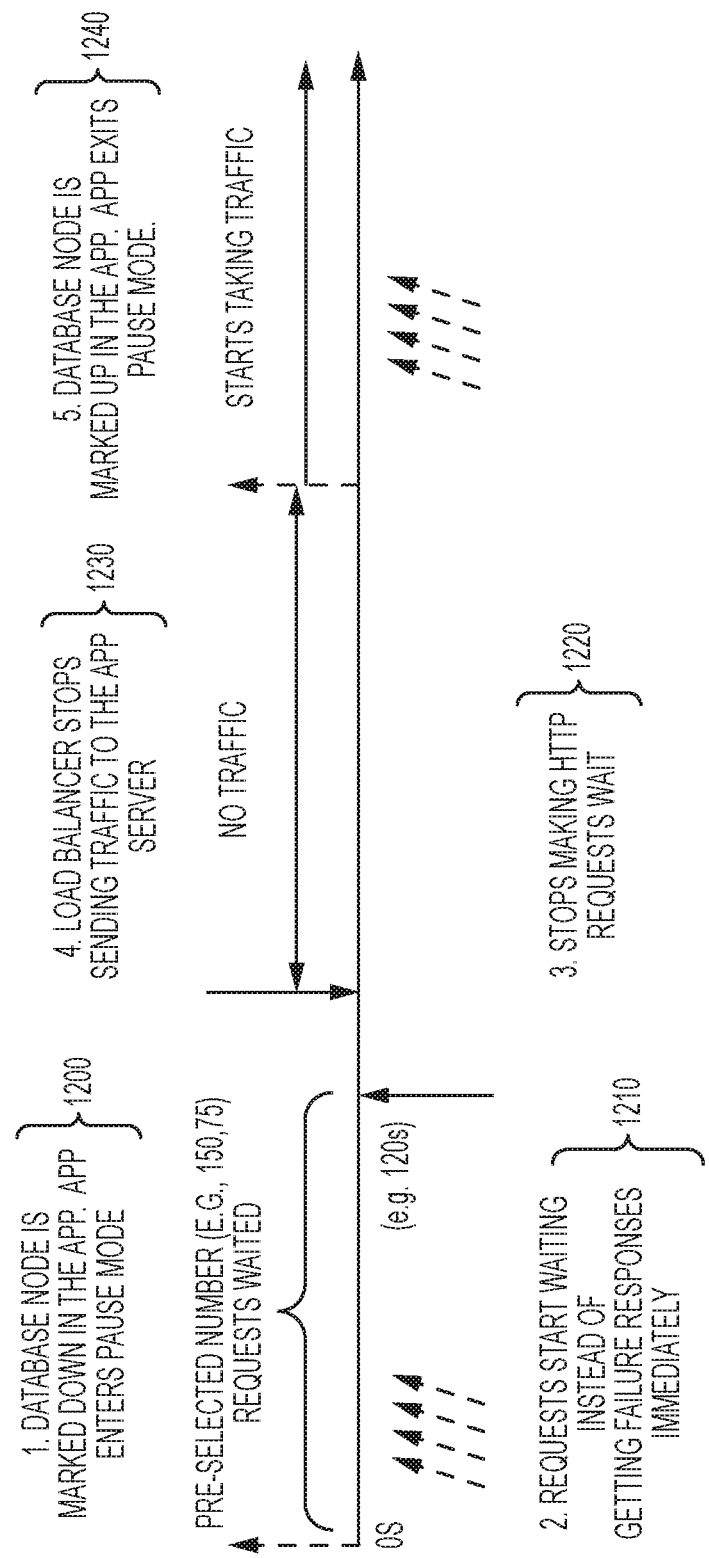
FIG. 12 is a timing diagram of one embodiment of a pause mode utilization.

FIG. 12 is a timing diagram of one embodiment of a pause mode utilization. The timing description of FIG. 12 can be utilized with the architectures described herein.

In one embodiment, when the database node is considered down (i.e., unavailable for any reason), the app server enters pause mode 1200. In one embodiment, during pause mode incoming requests wait within the app server (e.g., a request filter) for a pre-selected period of time (e.g., 120 seconds) rather than the app server providing a failure response (e.g., HTTP 503). In one embodiment, each request waits for at most the pre-selected period of time 1210 and if the database node is still not available at the end of the pre-selected period of time a failure notice can be sent to the requesting device, 1220.

In one embodiment, if requests are not serviced within the pre-selected period of time a load balancer (or other system component) can stop sending requests to the app server that does not have access to the database, 1230. Thus, the app server would receive no traffic.

In one embodiment, the app server continues to attempt to connect with the database node during the time that request wait and during the time that the app server is receiving no traffic. When the app server is able to connect with the database node again, the database node can be marked as available and the app server can exit pause mode, 1240. Thus, the app server can return to normal operation.

Figure 13:
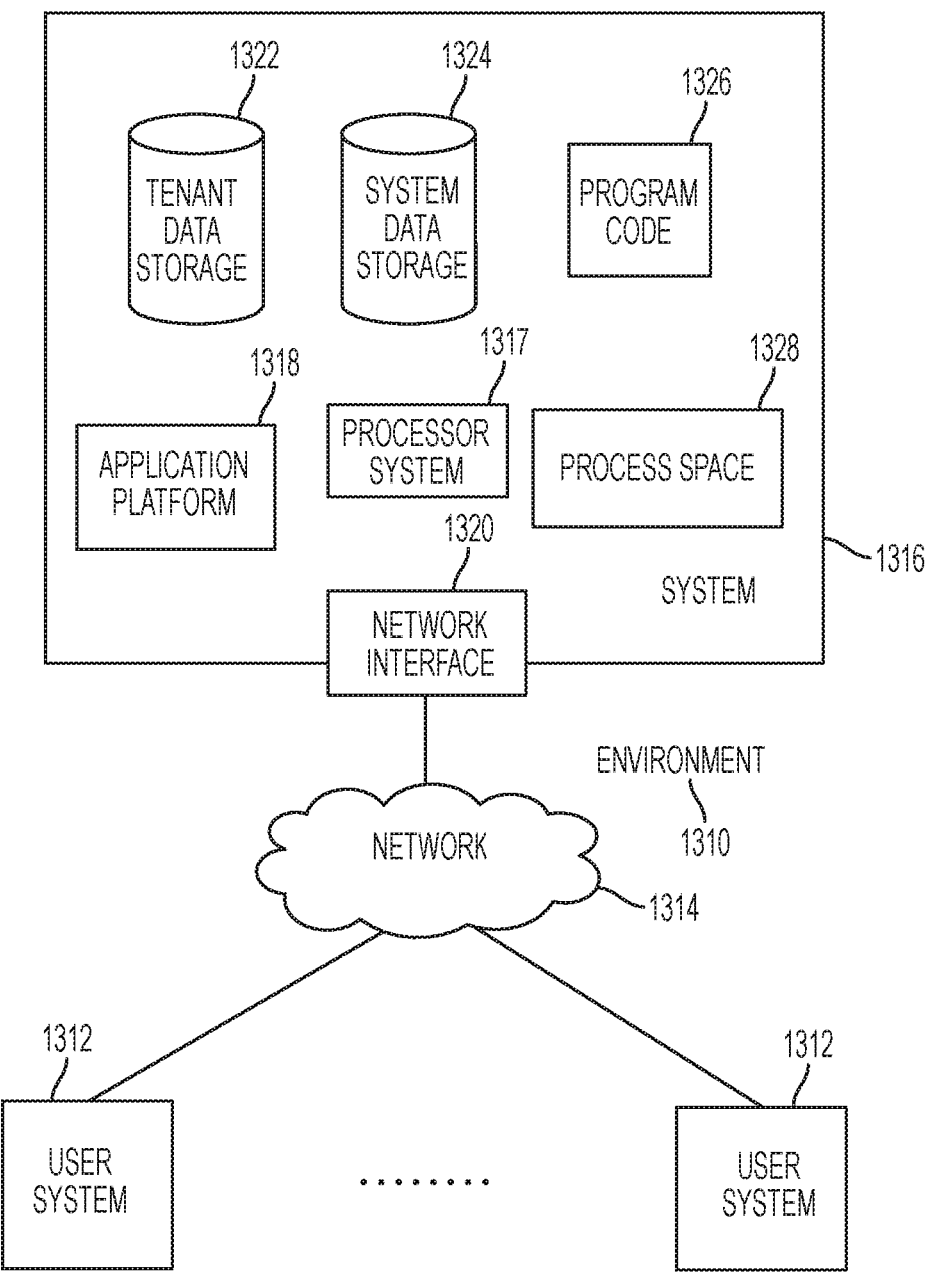
FIG. 13 illustrates a block diagram of an environment where an on-demand database service can be used.

FIG. 13 illustrates a block diagram of an environment 1310 wherein an on-demand database service might be used. Environment 1310 may include user systems 1312, network 1314, system 1316, processor system 1317, application platform 1318, network interface 1320, tenant data storage 1322, system data storage 1324, program code 1326, and process space 1328. In other embodiments, environment 1310 may not have all of the components listed and/or may have other elements instead of, or in addition to, those listed above.

Environment 1310 is an environment in which an on-demand database service exists. User system 1312 may be any machine or system that is used by a user to access a database user system. For example, any of user systems 1312 can be a handheld computing device, a mobile phone, a laptop computer, a work station, and/or a network of computing devices. As illustrated in herein FIG. 13 (and in more detail in FIG. 14) user systems 1312 might interact via a network 1314 with an on-demand database service, which is system 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" will be used interchangeably herein. A database image may include one or more database objects. A relational database management system (RDMS) or the equivalent may execute storage and retrieval of information against the database object(s). Application platform 1318 may be a framework that allows the applications of system 1316 to run, such as the hardware and/or software, e.g., the operating system. In an embodiment, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

The users of user systems 1312 may differ in their respective capacities, and the capacity of a particular user system 1312 might be entirely determined by permissions (permission levels) for the current user. For example, where a salesperson is using a particular user system 1312 to interact with system 1316, that user system has the capacities allotted to that salesperson. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1316, shown in FIG. 13, implements a web-based customer relationship management (CRM) system. For example, in one embodiment, system 1316 includes application servers configured to implement and execute CRM software applications as well as provide related data, code, forms, webpages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications, including a CRM application. User (or third party developer) applications, which may or may not include CRM, may be supported by the application platform 1318, which manages creation, storage of the applications into one or more database objects and executing of the applications in a virtual machine in the process space of the system 1316.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

Several elements in the system shown in FIG. 13 include conventional, well-known elements that are explained only briefly here. For example, each user system 1312 could include a desktop personal computer, workstation, laptop, PDA, cell phone, or any wireless access protocol (WAP) enabled device or any other computing device capable of interfacing directly or indirectly to the Internet or other network connection. User system 1312 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314. Each user system 1312 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1312 and all of its components are operator configurable using applications, such as a browser, including computer code run using a central processing unit such as an Intel Core series processor or the like. Similarly, system 1316 (and additional instances of an MTS, where more than one is present) and all of their components might be operator configurable using application(s) including computer code to run using a central processing unit such as processor system 1317, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

According to one embodiment, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 14:
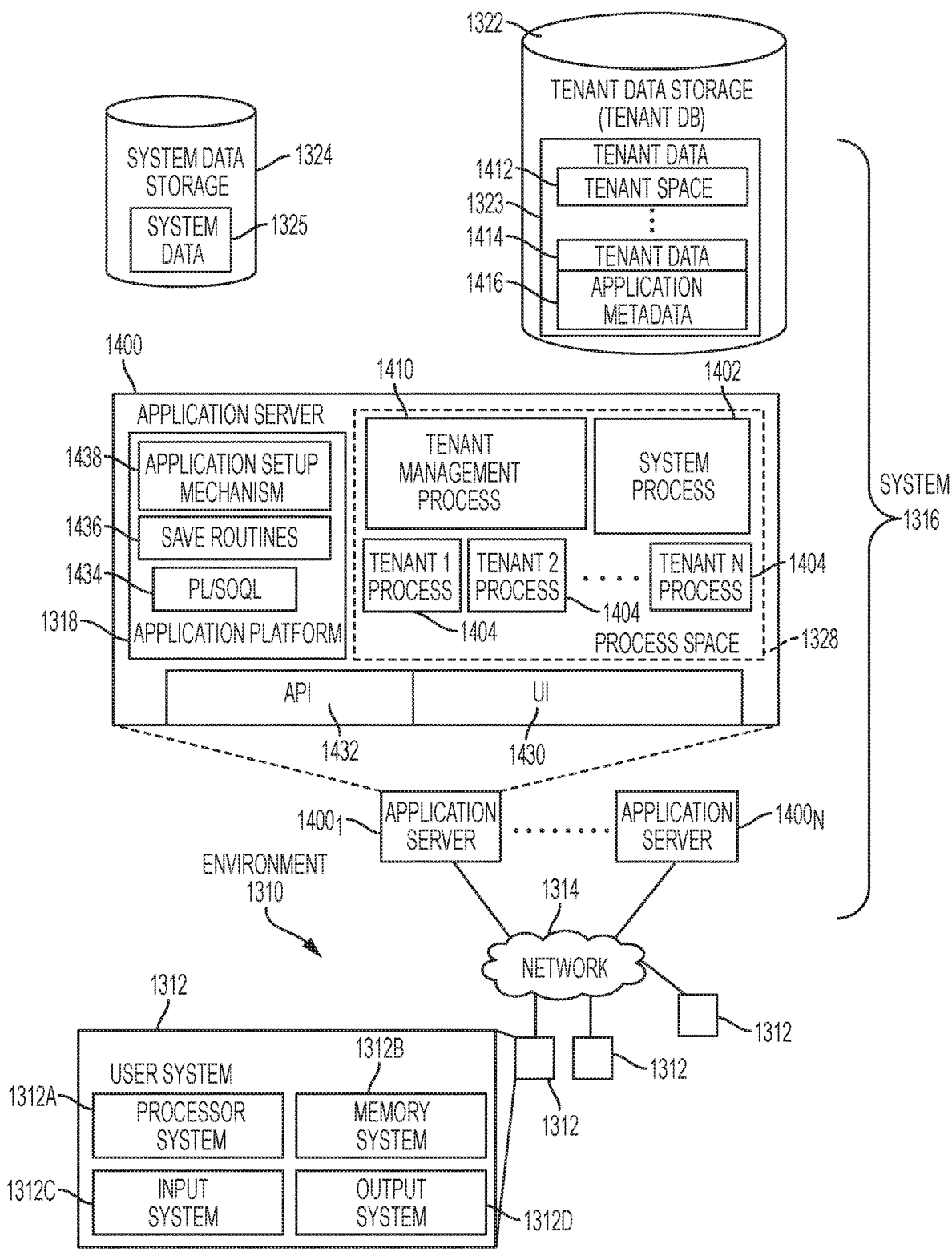
FIG. 14 illustrates a block diagram of an environment where an on-demand database service can be used.

FIG. 14 also illustrates environment 1310. However, in FIG. 14 elements of system 1316 and various interconnections in an embodiment are further illustrated. FIG. 14 shows that user system 1312 may include processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434, save routines 1436, application setup mechanism 1438, applications servers $1400_1$-$1400_N$, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of one or more processors. Memory system 1312B may be any combination of one or more memory devices, short term, and/or long term memory. Input system 1312C may be any combination of input devices, such as one or more keyboards, mice, trackballs, scanners, cameras, and/or interfaces to networks. Output system 1312D may be any combination of output devices, such as one or more monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as one or more Oracle™ databases.

Application platform 1318 includes an application setup mechanism 1438 that supports application developers' creation and management of applications, which may be saved as metadata into tenant data storage 1322 by save routines 1436 for execution by subscribers as one or more tenant process spaces 1404 managed by tenant management process 1410 for example. Invocations to such applications may be coded using PL/SOQL 1434 that provides a programming language style interface extension to API 1432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server $1400_1$ might be coupled via the network 1314 (e.g., the Internet), another application server $1400_{N-1}$ might be coupled via a direct network link, and another application server $1400_N$ might be coupled by yet a different network connection. Transfer Control Protocol and Internet Protocol (TCP/IP) are typical protocols for communicating between application servers 1400 and the database system. However, it will be apparent to one skilled in the art that other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In one embodiment, therefore, an interface system implementing a load balancing function (e.g., an F5 BIG-IP load balancer) is communicably coupled between the application servers 1400 and the user systems 1312 to distribute requests to the application servers 1400. In one embodiment, the load balancer uses a least connections algorithm to route user requests to the application servers 1400. Other examples of load balancing algorithms, such as round robin and observed response time, also can be used. For example, in certain embodiments, three consecutive requests from the same user could hit three different application servers 1400, and three requests from different users could hit the same application server 1400. In this manner, system 1316 is multi-tenant, wherein system 1316 handles storage of, and access to, different objects, data and applications across disparate users and organizations.

As an example of storage, one tenant might be a company that employs a sales force where each salesperson uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., one or more SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing predefined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium to provide, in a computing environment having multiple application servers each having at least one connection agent and at least one pause agent, the computing environment to be executed by one or more hardware processing components coupled with at least one memory device, the computing environment further having a database node, instructions that, when executed by one or more processors, are configurable to cause the one or more processors to:

detect an error condition between a first application server from the multiple application servers and the database node;

indicate that the database node is unavailable to stop attempts to access the database node by a first application server, wherein the attempts to access the database node are paused without an indication of the database node being unavailable to a source of the attempt to access the database node;

check periodically, with the first application server, availability of the database node;

indicate that the database node is available in response to a pre-selected number of successful attempts to contact the database node with the first application server;

provide read-only (RO) access to a backup database node in response to the database node not being available for a pre-selected period of time; and provide read/write (R/W) access to the backup database in response to the database node is available in response to a pre-selected number of successful attempts to contact the database node with the first application server.

2. The non-transitory computer-readable medium of claim 1 wherein the error condition comprises a connection between the first application server and the database node being non-responsive.

3. The non-transitory computer-readable medium of claim 1 wherein the error condition comprises the database node being unavailable.

4. The non-transitory computer-readable medium of claim 1 further comprising instructions that, when executed by the one or more processors, are configurable to cause the one or more processors to indicate that the database node is available in response to a pre-selected number of successful attempts to contact the database node with the first application server.

5. A method in a computing environment having multiple application servers each having at least one connection agent and at least one pause agent, the computing environment to be executed by one or more hardware processing components coupled with at least one memory device, the computing environment further having a database node, the method comprising:

detecting an error condition between a first application server from the multiple application servers and the database node;

indicating that the database node is unavailable to stop attempts to access the database node by a first application server, wherein the attempts to access the database node are paused without an indication of the database node being unavailable to a source of the attempt to access the database node;

checking periodically, with the first application server, availability of the database node;

indicating that the database node is available in response to a pre-selected number of successful attempts to contact the database node with the first application server;

providing read-only (RO) access to a backup database node in response to the database node not being available for a pre-selected period of time; and providing read/write (R/W) access to the backup database in response to the database node is available in response to a pre-selected number of successful attempts to contact the database node with the first application server.

6. The method of claim 5 wherein the error condition comprises a connection between the first application server and the database node being non-responsive.

7. The method of claim 5 wherein the error condition comprises the database node being unavailable.

8. The method of claim 5 further comprising indicating that the database node is available in response to a pre-selected number of successful attempts to contact the database node with the first application server.

9. A system having multiple application servers each having at least one connection agent and at least one pause agent, the computing environment to be executed by one or more hardware processing components coupled with at least one memory device, the computing environment further having a database node, the system comprising:

one or more memory devices; and one or more hardware processing components coupled with the one or more memory devices, the one or more hardware processing components configurable to detect an error condition between a first application server from the multiple application servers and the database node, to indicate that the database node is unavailable to stop attempts to access the database node by a first application server, wherein the attempts to access the database node are paused without an indication of the database node being unavailable to a source of the attempt to access the database node, to check periodically, with the first application server, availability of the database node, and to indicate that the database node is available in response to a pre-selected number of successful attempts to contact the database node with the first application server, to provide read-only (RO) access to a backup database node in response to the database node not being available for a pre-selected period of time, and to provide read/write (R/W) access to the backup database in response to the database node is available in response to a pre-selected number of successful attempts to contact the database node with the first application server.

10. The system of claim 9 wherein the error condition comprises a connection between the first application server and the database node being non-responsive.

11. The system of claim 9 wherein the error condition comprises the database node being unavailable.

12. The system of claim 9 further comprising indicating that the database node is available in response to a pre-selected number of successful attempts to contact the database node with the first application server.

* * * * *